US012796685B2

(12) United States Patent
Cui et al.

(10) Patent No.: US 12,796,685 B2
(45) Date of Patent: Nov. 17, 2026

(54) DUST MITE ATTRACTANT AND ITS MICROCAPSULE PREPARATION METHOD

(71) Applicant: Wuxi People's Hospital, Wuxi (CN)

(72) Inventors: Yubao Cui, Wuxi (CN); Ying Zhou, Wuxi (CN)

(73) Assignee: Wuxi People's Hospital, Wuxi City (CN)

(*) Notice: Subject to any disclaimer, the term of this patent is extended or adjusted under 35 U.S.C. 154(b) by 143 days.

(21) Appl. No.: 18/938,391

(22) Filed: Nov. 6, 2024

(65) Prior Publication Data

US 2025/0057159 A1 Feb. 20, 2025

(30) Foreign Application Priority Data

May 23, 2024 (CN) ......................... 202410645603.0

(51) Int. Cl.

| | |
|---|---|
| ***A01N 37/16*** | (2006.01) |
| ***A01N 25/04*** | (2006.01) |
| ***A01N 25/24*** | (2006.01) |
| ***A01N 25/28*** | (2006.01) |
| ***A01N 27/00*** | (2006.01) |
| ***A01N 31/02*** | (2006.01) |
| ***A01N 39/00*** | (2006.01) |
| ***A01N 65/08*** | (2009.01) |
| ***A01P 19/00*** | (2006.01) |
| ***A61Q 13/00*** | (2006.01) |

(52) U.S. Cl.

CPC ............ *A01N 37/16* (2013.01); *A01N 25/04* (2013.01); *A01N 25/24* (2013.01); *A01N 25/28* (2013.01); *A01N 27/00* (2013.01); *A01N 31/02* (2013.01); *A01N 39/00* (2013.01); *A01P 19/00* (2021.08)

(58) Field of Classification Search

None

See application file for complete search history.

(56) References Cited

U.S. PATENT DOCUMENTS

| | | | | |
|---|---|---|---|---|
| 2016/0309725 A1* | 10/2016 | Nair | ....................... | A01N 25/08 |
| 2019/0116777 A1* | 4/2019 | Akiba | ................... | A01M 1/145 |

FOREIGN PATENT DOCUMENTS

| | | | | |
|---|---|---|---|---|
| CN | 102078313 A | * 6/2011 | | |
| CN | 102078313 B | 5/2013 | | |
| CN | 106614773 A | * 5/2017 | ............. | A01N 65/00 |
| CN | 107404867 A | 11/2017 | | |
| WO | WO-2021206688 A1 | * 10/2021 | ........... | A61K 36/185 |

OTHER PUBLICATIONS

Babu, Kiran GD, and V. K. Kaul. "Variation in essential oil composition of rose-scented geranium (*Pelargonium* sp.) distilled by different distillation techniques." Flavour and fragrance journal 20.2 (2005): 222-231. (Year: 2005).*

Ali, Abbas, et al. "Insecticidal and biting deterrent activity of rose-scented geranium (*Pelargonium* spp.) essential oils and individual compounds against Stephanitis pyrioides and Aedes aegypti." Pest Management Science 69.12 (2013): 1385-1392. (Year: 2013).*

Tabanca, Nurhayat, et al. "Bioactivity-guided investigation of geranium essential oils as natural tick repellents." Journal of Agricultural and Food Chemistry 61.17 (2013): 4101-4107. (Year: 2013).*

Dzamic, Ana M., et al. "Chemical composition, antifungal and antioxidant activity of Pelargonium graveolens essential oil." Journal of Applied Pharmaceutical Science 4.3 (2014): 001-005. (Year: 2014).*

Roman, Sara, Catalina Voaides, and Narcisa Babeanu. "Exploring the sustainable exploitation of bioactive compounds in *Pelargonium* sp.: beyond a fragrant plant." Plants 12.24 (2023): 4123. (Year: 2023).*

Benzaid, Chahrazed, et al. "Pelargonium graveolens essential oil against clinical Candida and reference isolates: insights into virulence inhibition and therapeutic perspectives." Frontiers in Fungal Biology 7 (2026): 1868001. (Year: 2026).*

* cited by examiner

*Primary Examiner* — Bethany P Barham
*Assistant Examiner* — Peter Anthopolos

(57) ABSTRACT

A dust mite attractant, including 1-10 parts by weight of neryl propionate, 1-4 parts by weight of geranyl formate, 1-8 parts by weight of methyl eugenol, 1-8 parts by weight of geraniol and 1-6 parts by weight of a terpene. In the preparation process of a microcapsule of the dust mite attractant, an aqueous phase, an oil phase, and a tetraethylenepentamine solution are separately prepared. The aqueous phase is slowly added with the oil phase, and emulsified to obtain an emulsified mixture. The emulsified mixture is transferred to an oil bath, added dropwise with the tetraethylenepentamine solution and reacted at a constant temperature for 2.5 h to obtain the microcapsule.

6 Claims, 7 Drawing Sheets

DUST MITE ATTRACTANT AND ITS MICROCAPSULE PREPARATION METHOD

CROSS-REFERENCE TO RELATED APPLICATIONS

This application claims the benefit of priority from Chinese Patent Application No. 202410645603.0, filed on May 23, 2024. The content of the aforementioned application, including any intervening amendments made thereto, is incorporated herein by reference in its entirety.

TECHNICAL FIELD

This application relates to dust mite attractants, and more particularly to a dust mite attractant and its microcapsule preparation method.

BACKGROUND

Dust mites are primary allergens commonly found in household dust, and approximately 10% to 20% of people worldwide are allergic to them. They will trigger type I allergic hypersensitivity reaction, such as allergic asthma, allergic rhinitis, dermatitis, and chronic urticaria. They widely breed in household items (e.g., carpets, mattresses, and sofa) and daily necessities as well as food items, such that it is difficult to control and treat them. As people increasingly prioritize their health and living environments, especially those affected by dust mite allergies and their families, there has been a growing emphasis on the prevention and control of dust mites. Attractants, as a technological approach to pest management, are also gaining popularity.

There are currently a wide variety of products available on the market for controlling dust mites, most of which have a complex action mechanism. Therefore, there is an urgent need to develop an efficient and safe attractant, which could attract the dust mites in the living environment to facilitate the subsequent control and treatment, so as to prevent the allergic reaction caused thereby.

SUMMARY

In order to diversify the dust mite control approaches in the prior art, the present disclosure provides a dust mite attractant and a method for preparing a microcapsule thereof, which enable the efficient, safe, and easy control of dust mites.

Technical solutions of the present disclosure are described as follows.

In a first aspect, this application provides a dust mite attractant, comprising:

1-10 parts by weight of neryl propionate;
1-4 parts by weight of geranyl formate;
1-8 parts by weight of methyl eugenol;
1-8 parts by weight of geraniol; and
1-6 parts by weight of terpene.

In some embodiments, a weight ratio of the neryl propionate to the geranyl formate to the methyl eugenol to the geraniol to the terpene is 10:4:4:1:1.

In some embodiments, the dust mite attractant is in a form of solid or liquid.

In a second aspect, this application provides a method for preparing a microcapsule of the dust mite attractant, comprising:

(1) mixing gum arabic and deionized water in a weight ratio of 1.5:100 to obtain an aqueous phase;

(2) mixing the neryl propionate, the geranyl formate, the methyl eugenol, the geraniol, and the terpene to obtain a liquid mixture, and mixing the liquid mixture with isophorone diisocyanate in a weight ratio of 2.5:3.7 to obtain an oil phase; wherein a weight ratio of the liquid mixture to the gum arabic is 5:3;

(3) mixing tetraethylenepentamine and deionized water in a weight ratio of 1.25:30 to obtain a tetraethylenepentamine solution; wherein a weight ratio of the tetraethylenepentamine to the gum arabic is 5:6;

(4) adding the oil phase obtained in step (2) into the aqueous phase obtained in step (1) followed by emulsification to obtain an emulsified mixture; and (5) transferring the emulsified mixture to a three-necked flask and transferring the three-necked flask to an oil bath at 35° C.; and dropwise adding the tetraethylenepentamine solution obtained in step (3) to the three-necked flask followed by reaction at 65° C. to obtain the microcapsule.

In some embodiments, in step (4), the emulsification is performed sequentially by shear emulsification at 10,000 rpm for 8 min and ultrasonic emulsification under stirring for 10 min.

In some embodiments, in step (5), the reaction is performed at a rotation speed of 600 rpm for 2.5 h.

Compared to the prior art, the present disclosure has the following beneficial effects.

(1) Any one of the five components in the attractant of the present disclosure exhibits an attractive effect on dust mites, particularly neryl propionate and geranyl formate, which demonstrate excellent efficacy in attracting dust mites. Compared with the existing mite prevention and control products with complex action mechanism, the present disclosure is easy to operate. Specifically, attractant components contain mite aggregation pheromones, which can produce a scent to attract the mites to assemble, thereby facilitating the treatment of mites and reducing the number of dust mites in the living environment.

(2) Compared to those compositions composed of one, two, three or fourth selected from the group consisting of neryl propionate, geranyl formate, methyl eugenol, geraniol, the terpene, the attractant composed of the five selected components in the present disclosure exhibits a significantly-enhanced attracting efficacy. Additionally, these five substances have a slow volatile rate, and are non-toxic, all of which are components of natural or synthetic fragrances. These substances are easily soluble, and are easy to prepare. Furthermore, they all possess a pleasant fragrance such that they can improve the production, storage, and application environments.

(3) It has been experimentally demonstrated that the attractant provided by the present disclosure exhibits a significant attracting effect on *Dermatophagoides pteronyssinus* and *Dermatophagoides farinae* (two common species of dust mites). This attractant can effectively attract dust mites within 48 h and 96 h. In addition, different preparation forms (liquid and solid) exhibit a similar attracting effect. Therefore, the attractant of the present disclosure has superior efficacy, excellent long-acting characteristic, and diverse forms, such that it can adapt to various application environments.

(4) The present disclosure also provides a method for preparing the dust mite attractant microcapsule, in which the liquid attractant is uniformly mixed with isophorone diisocyanate to form the oil phase. Based on good solubility of individual components of the attractant in an organic solvent, the prepared oil phase is stable, in which individual components are not susceptible to decomposition, and reaction with each other.

The technical solutions of the present disclosure will be described in further detail below with reference to the accompanying drawings and embodiments.

DETAILED DESCRIPTION OF EMBODIMENTS

Figure 1:
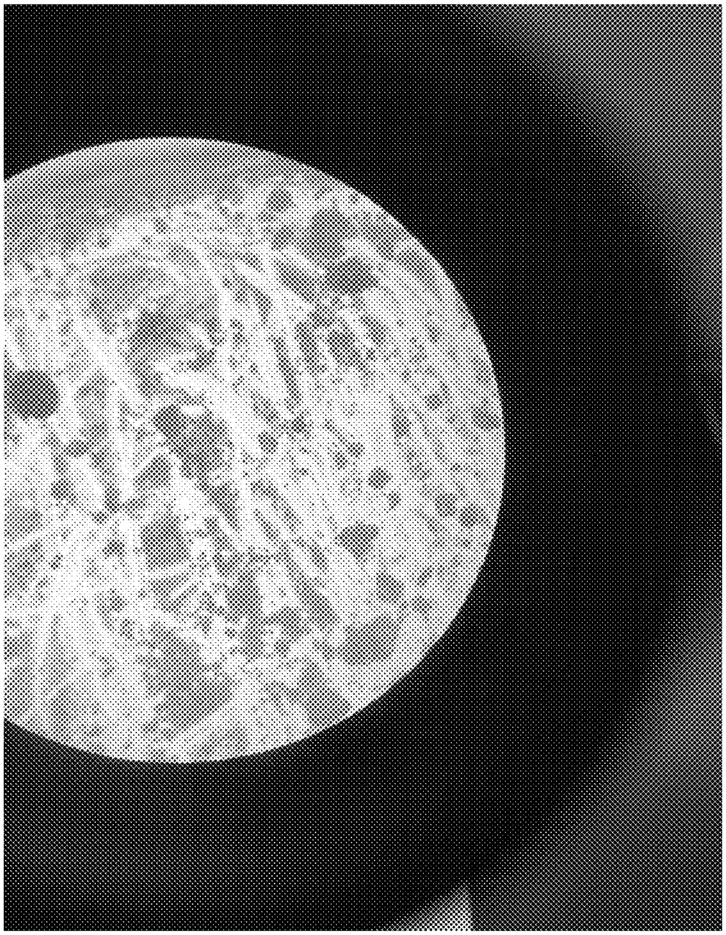
FIG. 1 is a microscopic image of a dust mite attractant microcapsule prepared in Example 6 of the present disclosure.

To facilitate the understanding of the present disclosure, a more comprehensive description will be provided below with reference to the accompanying drawings, in which several embodiments of the disclosure are illustrated. However, the present disclosure can be implemented in various forms and is not limited to the embodiments described herein. Rather, the provision of these embodiments is intended to illustrate the technical solutions disclosed in the present disclosure more fully and completely.

Example 1

Provided herein was a liquid dust mite attractant, which included neryl propionate, geranyl formate, methyl eugenol, geraniol and a terpene in a weight ratio of 10:4:4:1:1.

The liquid dust mite attractant was prepared as follows.

The neryl propionate, the geranyl formate, the methyl eugenol, the geraniol, and the terpene (all liquid materials) were mixed uniformly according to the above weight ratio to obtain the liquid attractant, which was stored in the dark for use.

Example 2

The dust mite attractant provided herein was different from that provided in Example 1 merely in the compounding ratio of individual ingredients. Specifically, in this example, the weight ratio of the neryl propionate to the geranyl formate to the methyl eugenol to the geraniol to the terpene was 1:1:5:5:5.

Example 3

The dust mite attractant provided herein was different from that provided in Example 1 merely in the compounding ratio of individual ingredients. Specifically, in this example, the weight ratio of the neryl propionate to the geranyl formate to the methyl eugenol to the geraniol to the terpene was 5:4:8:8:6.

Example 4

The dust mite attractant provided herein was different from that provided in Example 1 merely in the compounding ratio of individual ingredients. Specifically, in this example, the weight ratio of the neryl propionate to the geranyl formate to the methyl eugenol to the geraniol to the terpene was 5:3:3:4:3.

Example 5

The dust mite attractant provided herein was different from that provided in Example 1 merely in the compounding ratio of individual ingredients. Specifically, in this example, the weight ratio of the neryl propionate to the geranyl formate to the methyl eugenol to the geraniol to the terpene was 1:1:1:1:1.

Example 6

Provided herein was a dust mite attractant in the form of microcapsule, which included neryl propionate, geranyl formate, methyl eugenol, geraniol and a terpene in a weight ratio of 10:4:4:1:1.

The dust mite attractant microcapsule was prepared as follows.

Step (1) Preparation of an Aqueous Phase 1.5 g of gum arabic and 100 mL of deionized water were mixed uniformly to obtain the aqueous phase.

Step (2) Preparation of an Oil Phase 2.5 g of the liquid attractant obtained in EXAMPLE 1 and 3.7 g of isophorone diisocyanate were mixed uniformly to obtain the oil phase.

Step (3) Preparation of a Tetraethylenepentamine Solution 1.25 g of tetraethylenepentamine and 30 g of deionized water were mixed uniformly to obtain the tetraethylenepentamine solution.

Step (4) Emulsification

The aqueous phase obtained in step (1) was slowly added with the oil phase obtained in step (2), and subjected to high-speed shear emulsification at 10,000 rpm for 8 min, and ultrasonic emulsification under stirring for 10 min to obtain an emulsified mixture.

Step (5) The emulsified mixture was transferred to a three-necked flask, which was placed in an oil bath at 35° C. and 600 rpm, and dropwise added with the tetraethylenepentamine solution obtained in step (3). After that, the oil bath temperature was increased to 65° C., and the reaction was performed at such temperature for 2.5 h to obtain the solid attractant (microcapsule) for dust mites.

Example 7

The solid attractant prepared in Example 6 for dust mites was observed under a microscope, as shown in FIG. 1.

Figure 2A:
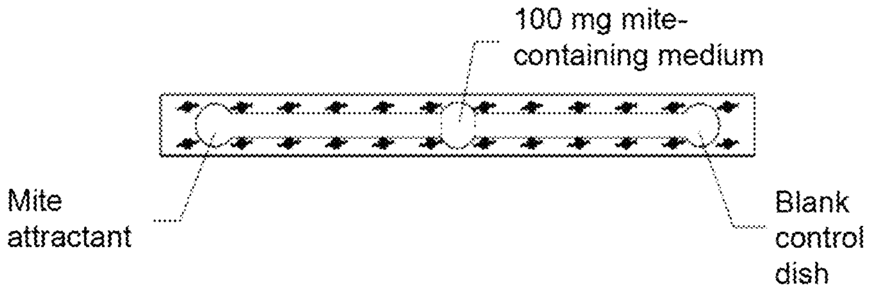
FIG. 2A is a top view of a long-range olfactometer used in Example 7 of the present disclosure.
Figure 2B:
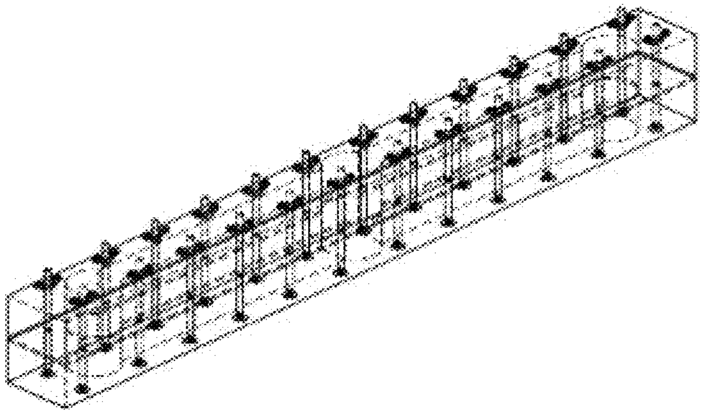
FIG. 2B is a perspective view of the long-range olfactometer used in Example 6 of the present disclosure.

Experiment 1. Detection of Attracting Effects of Liquid Attractants from Examples 1-5 on Dust Mites The testing process was performed based on a long-range olfactometer (1100 mm×100 mm×80 mm). As shown in FIGS. 2A-2B, a circular release area was set at the middle, and a circular test area and a blank control area are respectively set at two ends. The bottom part of the olfactometer contains a water tank to maintain the humidity, and the internal path is covered with a 240-mesh sieve cloth. The upper polymethyl methacrylate wall of the olfactometer was coated with petroleum jelly to prevent the mites from escaping. Two Petri dishes (40 mm) coated with paraffin oil (the paraffin oil could ensure the slow release of the attractant and prevent the mites from escaping) were placed on the sieve cloth in the test and blank control areas, respectively.

The liquid attractant was dissolved in n-hexane and then added to the Petri dish in the test area. 100 mg of yeast feed was added to the Petri dish coated with paraffin oil in the blank control area. After that, 100 mg of a mite-containing culture was placed on a filter paper (60 mm) at the center of the release area. After 48 h, the mites in the Petri dishes from the test and blank control areas were counted, respectively. This experiment was performed in triplicate, and the results were averaged and shown in Table 1 and FIG. 3.

TABLE 1

Attracting effects of attractants varying in the compounding ratio on dust mites

| Attractants | First group (the number of mites) | | Second group (the number of mites) | | Third group (the number of mites) | | Mean value (the number of mites) | |
|---|---|---|---|---|---|---|---|---|
| | Test dish | Blank control dish | Test dish | Blank control dish | Test dish | Blank control dish | Test dish | Blank control dish |
| EXAMPLE 1 (10:4:4:1:1) | 161 | 20 | 94 | 16 | 143 | 31 | 100.9 | 22.3 |
| EXAMPLE 2 (1:1:5:5:5) | 40 | 17 | 21 | 26 | 46 | 21 | 35.7 | 21.3 |
| EXAMPLE 3 (5:4:8:8:6) | 78 | 10 | 87 | 37 | 73 | 16 | 79.3 | 21 |
| EXAMPLE 4 (5:3:3:4:3) | 66 | 33 | 41 | 11 | 54 | 26 | 53.7 | 23.3 |
| EXAMPLE 5 (1:1:1:1:1) | 18 | 31 | 26 | 18 | 14 | 22 | 19.3 | 23.7 |

Figure 3:
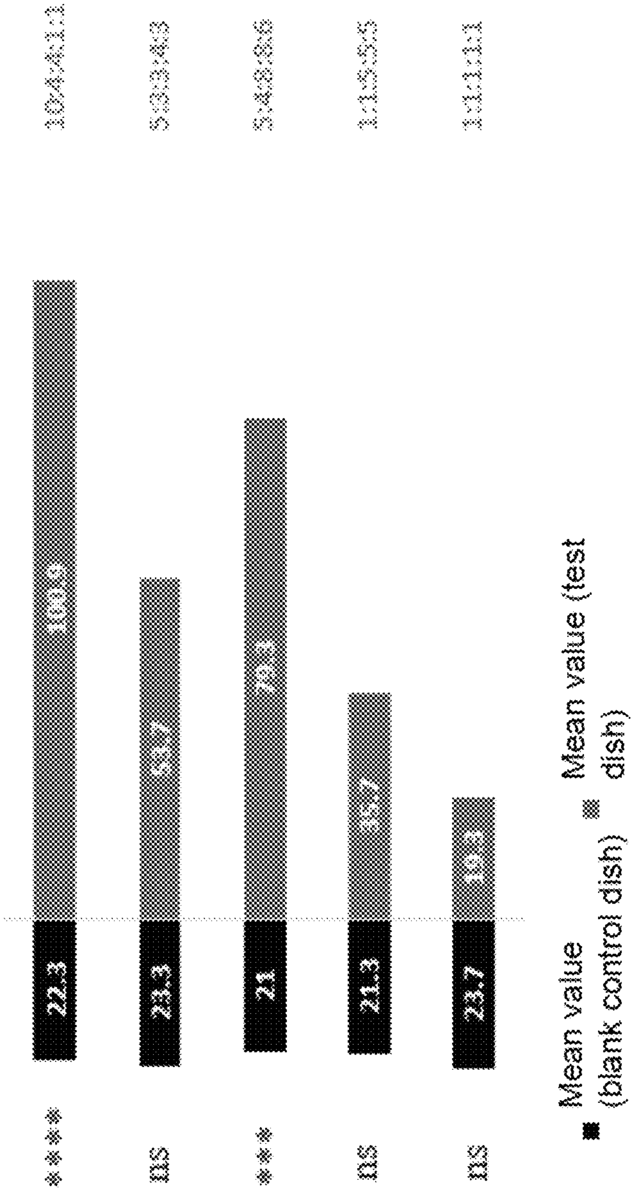
FIG. 3 shows data statistical results in Experiment 1 of Example 7 of the present disclosure.

It could be seen from Table 1 and FIG. 3 that the liquid dust mite attractant provided herein exhibited a remarkable attracting effect on dust mites, where the optimal effect was reached when the weight ratio of the neryl propionate to the geranyl formate to the methyl eugenol to the geraniol to the terpene was 10:4:4:1:1.

Experiment 2. Investigation of Attracting Effect of Solid Dust Mite Attractant from Example 6 at Different Moments The testing process was performed also based on the long-range olfactometer (1100 mm×100 mm×80 mm). The solid attractant was added to the Petri dish within the test area, and 100 mg of yeast feed was added to the Petri dish coated with paraffin oil in the blank control area. After that, 100 mg of a mite culture was placed on a filter paper (60 mm) at the center of the release area. After 48 h and 96 h, the mites in the Petri dishes from the test and blank control areas were counted, respectively. This experiment was performed in triplicate, and the results were averaged and shown in Table 2 and FIG. 4.

TABLE 2

Counting results of mites at different moments

| Attracting time | First group (the number of mites) | | Second group (the number of mites) | | Third group (the number of mites) | | Mean value (the number of mites) | |
|---|---|---|---|---|---|---|---|---|
| | Test dish | Blank control dish | Test dish | Blank control dish | Test dish | Blank control dish | Test dish | Blank control dish |
| 48 h | 38 | 21 | 61 | 33 | 44 | 7 | 47.7 | 20.3 |
| 96 h | 44 | 11 | 47 | 17 | 30 | 22 | 41.3 | 16.7 |

Figure 4:
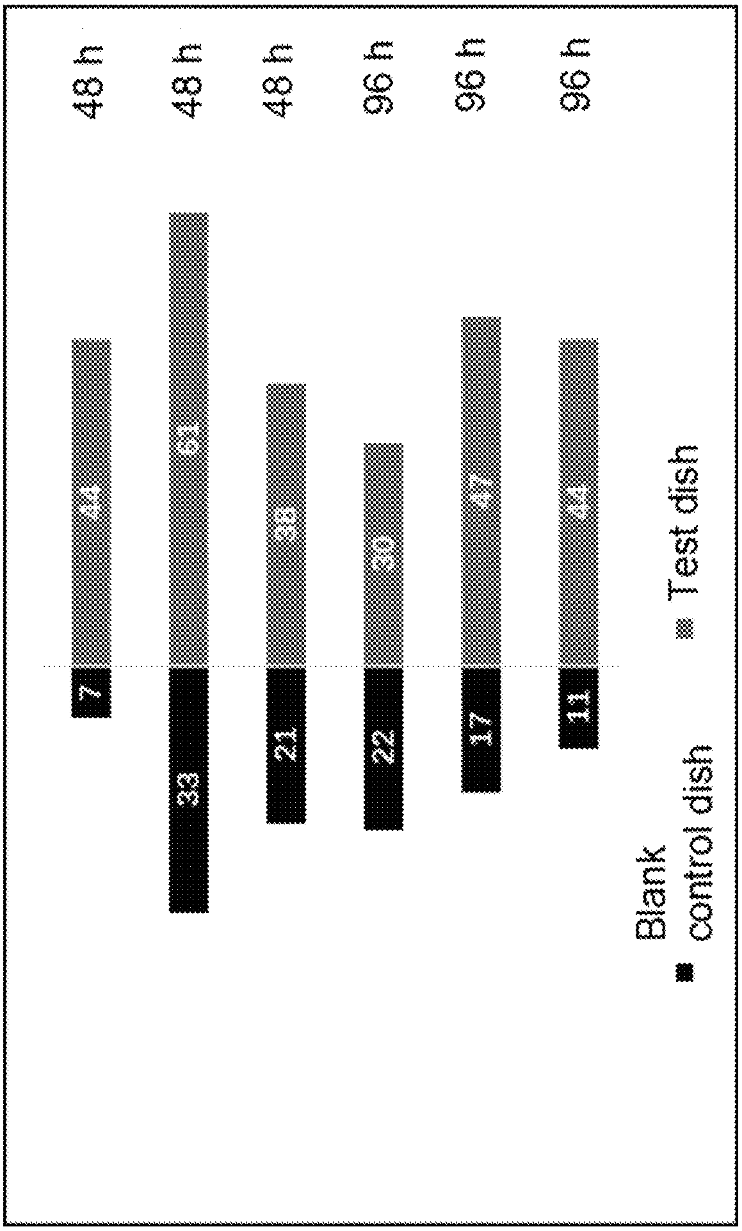
FIG. 4 shows data statistical results in Experiment 2 of Example 7 of the present disclosure.

It could be demonstrated by Table 2 and FIG. 4 that the solid dust mite attractant provided herein could effectively attract the dust mites, and the attracting effect was demonstrated at both 48 h and 96 h.

Experiment 3. Investigation of Attracting Effects of Solid and Liquid Dust Mite Attractants on Different Species of Dust Mites The testing process was performed based on the same long-range olfactometer (1100 mm×100 mm×80 mm). The liquid dust mite attractant was dissolved in n-hexane and then added to the Petri dish in the test area, while the solid dust mite attractant was added to the Petri dish in the blank control area. After that, 100 mg of a mite (*Dermatophagoides farinae*)-containing culture was placed on a filter paper (60 mm) at the center of the release area. After 48 h and 96 h, the mites in the Petri dishes from the test and blank control areas were counted, respectively. This experiment was performed in triplicate, and the results were averaged and shown in Table 3 and FIG. 5A.

TABLE 3

Attracting effects of different forms of attractants on *Dermatophagoides farinae*

| | First group (the number of mites) | | Second group (the number of mites) | | Third group (the number of mites) | | Mean value (the number of mites) | |
|---|---|---|---|---|---|---|---|---|
| Attracting time | Test dish | Blank control dish | Test dish | Blank control dish | Test dish | Blank control dish | Test dish | Blank control dish |
| 48 h | 47 | 18 | 32 | 11 | 43 | 25 | 40.7 | 18 |
| 96 h | 75 | 44 | 45 | 47 | 76 | 30 | 65.3 | 48 |

The *Dermatophagoides farinae*-containing culture was replaced with a *Dermatophagoides pteronyssinus*-containing culture to investigate the attracting effect on *Dermatophagoides pteronyssinus* according to the above process. The results were shown in Table 4 and FIG. 5B.

TABLE 4

Attracting effects of different forms of attractants on *Dermatophagoides pteronyssinus*

| | First group (the number of mites) | | Second group (the number of mites) | | Third group (the number of mites) | | Mean value (the number of mites) | |
|---|---|---|---|---|---|---|---|---|
| Attracting time | Test dish | Blank control dish | Test dish | Blank control dish | Test dish | Blank control dish | Test dish | Blank control dish |
| 48 h | 47 | 11 | 33 | 21 | 61 | 29 | 47 | 20.3 |
| 96 h | 23 | 0 | 17 | 5 | 27 | 0 | 25.7 | 1.7 |

Figure 5A:
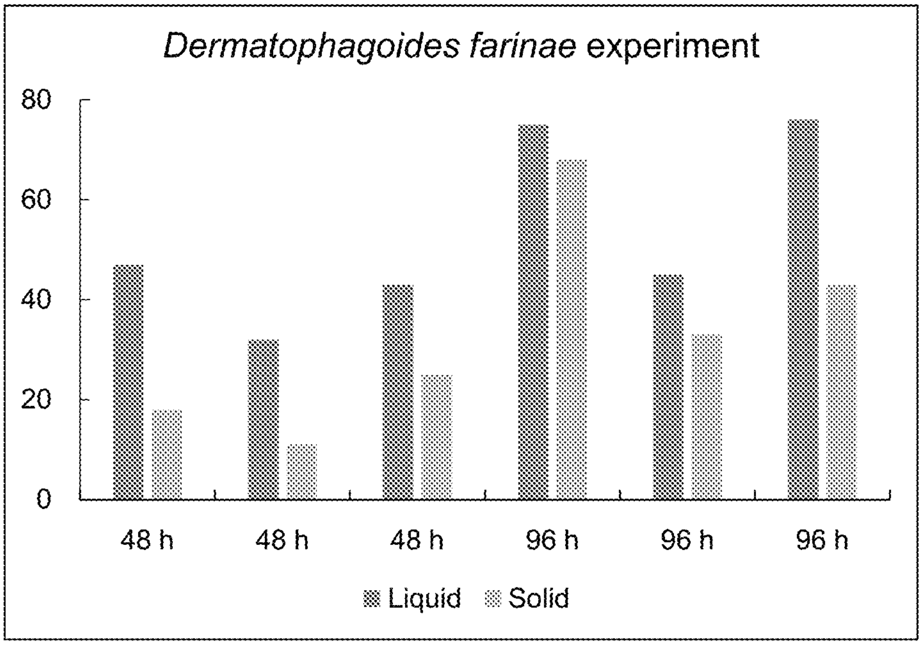
FIGS. 5A-5B show data statistical results in Experiment 3 of Example 7 of the present disclosure.
Figure 5B:
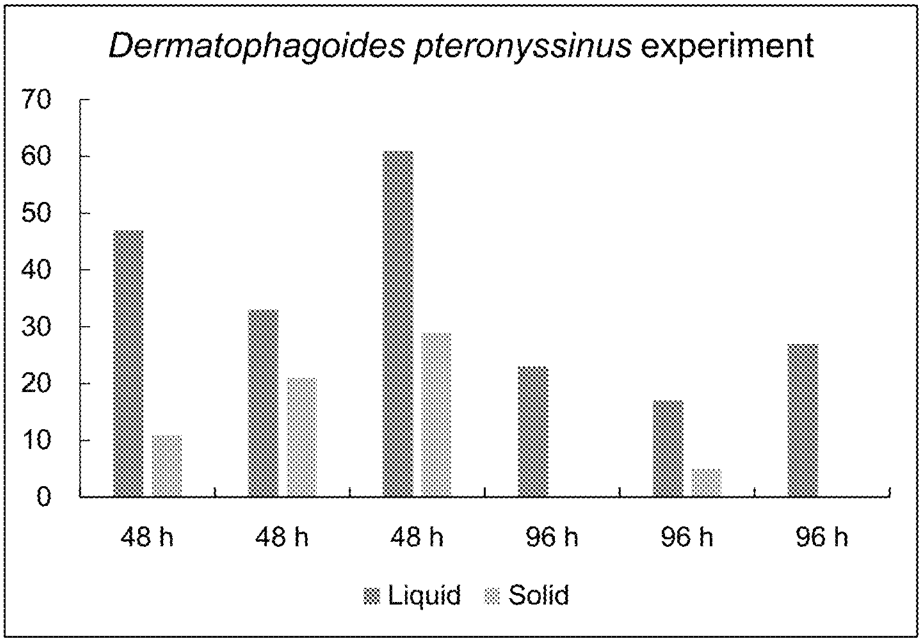

As shown in Tables 3-4, and FIGS. 5A-5B, it could be seen that both the liquid and solid attractants provided herein exhibited attracting effects on the two species of dust mites, and there was no significant difference in the attracting effect between the two forms.

The embodiments described above are merely illustrative of the present disclosure, and are not intended to limit the scope of the present disclosure. It should be understood that various changes or substitutions made by those of ordinary skill in the art without departing from the spirit of the present disclosure shall fall within the scope of the present disclosure defined by the appended claims.

What is claimed is:

1. A dust mite attractant, comprising:

1-10 parts by weight of neryl propionate;

1-4 parts by weight of geranyl formate;

1-8 parts by weight of methyl eugenol;

1-8 parts by weight of geraniol; and 1-6 parts by weight of a terpene.

2. The dust mite attractant of claim 1, wherein a weight ratio of the neryl propionate to the geranyl formate to the methyl eugenol to the geraniol to the terpene is 10:4:4:1:1.

3. The dust mite attractant of claim 1, wherein the dust mite attractant is in a form of solid or liquid.

4. A method for preparing a microcapsule of the dust mite attractant of claim 1, comprising:

(1) mixing gum arabic and deionized water in a weight ratio of 1.5:100 to obtain an aqueous phase;

(2) mixing the neryl propionate, the geranyl formate, the methyl eugenol, the geraniol, and the terpene to obtain a liquid mixture, and mixing the liquid mixture with isophorone diisocyanate in a weight ratio of 2.5:3.7 to obtain an oil phase; wherein a weight ratio of the liquid mixture to the gum arabic is 5:3;

(3) mixing tetraethylenepentamine and deionized water in a weight ratio of 1.25:30 to obtain a tetraethylenepentamine solution; wherein a weight ratio of the tetraethylenepentamine to the gum arabic is 5:6;

(4) adding the oil phase obtained in step (2) into the aqueous phase obtained in step (1) followed by emulsification to obtain an emulsified mixture; and (5) transferring the emulsified mixture to a three-necked flask and transferring the three-necked flask to an oil bath at 35° C.; and dropwise adding the tetraethylenepentamine solution obtained in step (3) to the three-necked flask followed by reaction at 65° C. to obtain the microcapsule.

5. The method of claim 4, wherein in step (4), the emulsification is performed sequentially by shear emulsification at 10,000 rpm for 8 min and ultrasonic emulsification under stirring for 10 min.

6. The method of claim 4, wherein in step (5), the reaction is performed at a rotation speed of 600 rpm for 2.5 h.

* * * * *